United States Patent [19]

Khanarian et al.

[11] Patent Number: 5,064,265
[45] Date of Patent: Nov. 12, 1991

[54] OPTICAL PARAMETRIC AMPLIFIER

[75] Inventors: Garo Khanarian, Union City, N.J.; Robert Norwood, Bethelehem, Pa.

[73] Assignee: Hoechst Celanese Corp., Somerville, N.J.

[21] Appl. No.: 533,188

[22] Filed: Jun. 4, 1990

[51] Int. Cl.$^5$ .................................................. G02F 1/39
[52] U.S. Cl. ...................................... 385/130; 385/141; 385/14; 359/332; 359/333
[58] Field of Search ............... 350/96.12, 96.15, 96.29, 350/96.34; 307/425–430

[56] References Cited

U.S. PATENT DOCUMENTS

| | | | |
|---|---|---|---|
| 4,199,698 | 4/1980 | Bethea et al. | 307/425 |
| 4,557,551 | 12/1985 | Dyott | 350/96.15 |
| 4,693,545 | 9/1987 | Henningsen et al. | 350/96.12 |
| 4,859,876 | 8/1989 | Dirk et al. | 307/425 |
| 4,887,884 | 12/1989 | Hayden | 350/96.29 |
| 4,895,422 | 1/1990 | Rand et al. | 350/96.15 |
| 4,909,598 | 3/1990 | Ninomiya et al. | 350/96.34 |

Primary Examiner—John D. Lee
Attorney, Agent, or Firm—Michael W. Ferrell

[57] ABSTRACT

In one embodiment this invention provides an integrated optical parametric amplifier device with an organic waveguiding matrix which exhibits second order nonlinear response, and which has a spatial periodic structure for quasi-phase matching of propagating waves. In a preferred type of device the waveguiding matrix has a two-dimensional channel configuration, and the matrix surfaces are in contact with organic cladding layers which exhibit second order nonlinear optical response and which have a lower index of refraction than the channel waveguiding medium.

12 Claims, 3 Drawing Sheets

CHANNEL WAVEGUIDE OPTICAL PARAMETRIC AMPLIFIER

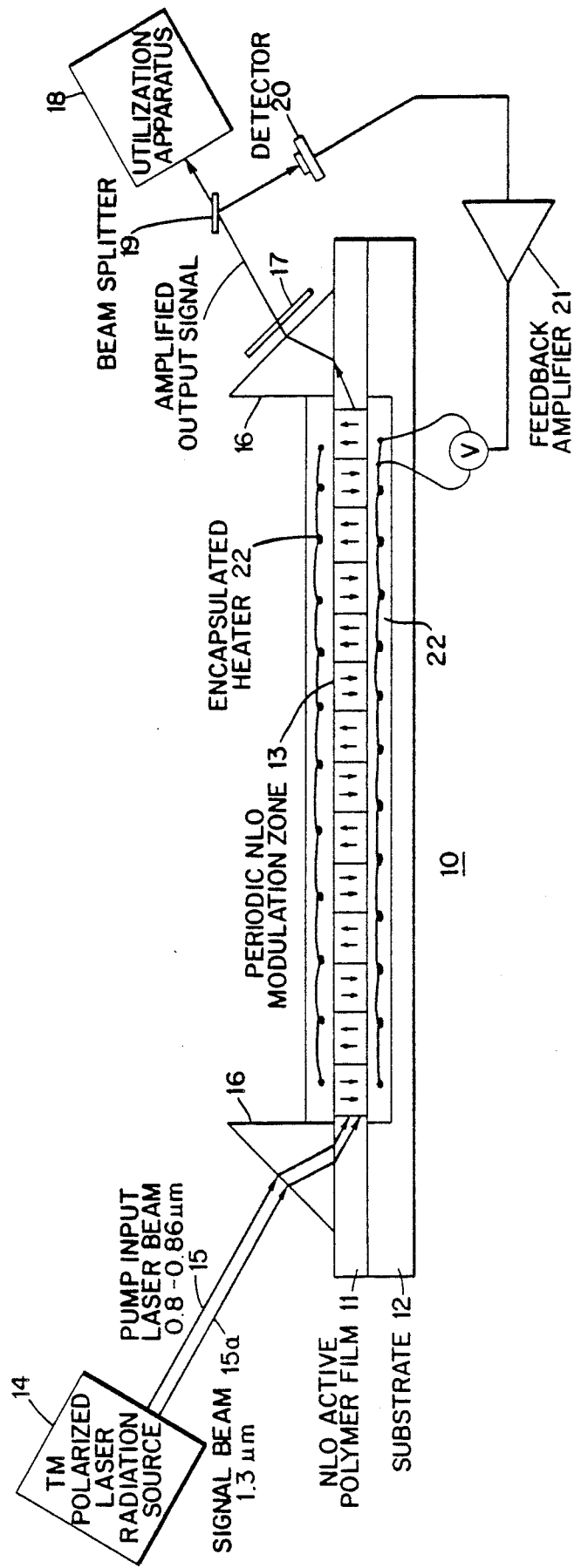

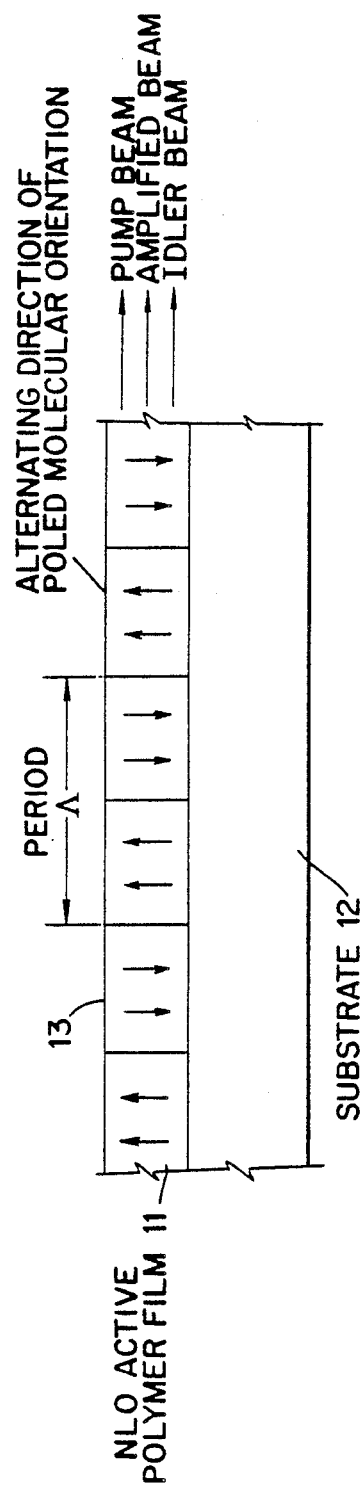
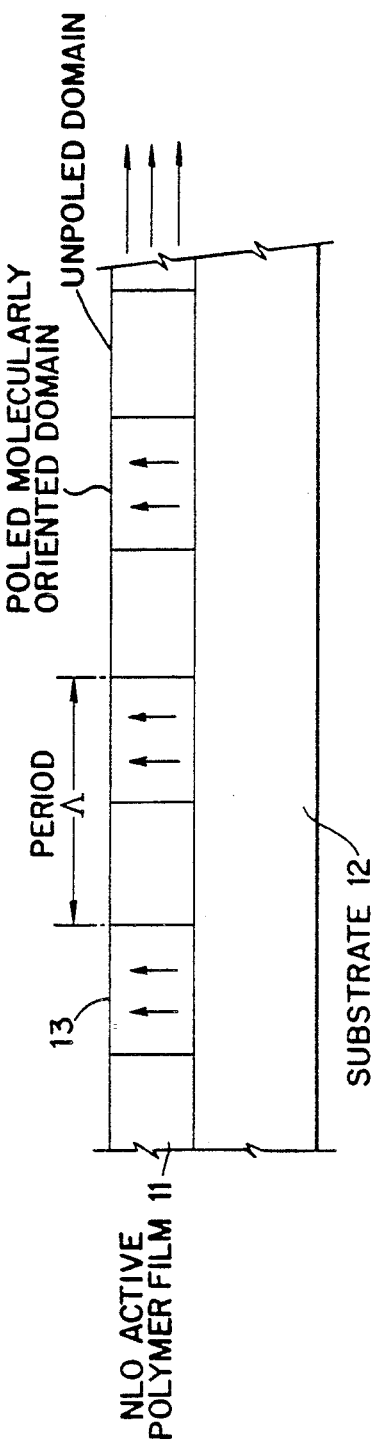

CHANNEL WAVEGUIDE OPTICAL PARAMETRIC AMPLIFIER

OPTICAL PARAMETRIC AMPLIFIER

CROSS-REFERENCE TO RELATED PATENT APPLICATION

The subject matter of this patent application is related to that disclosed in U.S. patent application Ser. No. 405,501, filed Sept. 11, 1989.

BACKGROUND OF THE INVENTION

An optical parametric amplifier typically comprises a material that has a nonlinear, i.e., amplitude-dependent, response to each incident light wave. In addition to an information-modulated wave to be amplified, a pumping wave of another frequency is applied to the material to interact with and transfer energy to the information-modulated wave. The amplification of the information-modulated wave produced by this transfer of energy is called parametric gain.

The main line of development both of optical second harmonic generators and of optical parametric amplifiers has centered around the use of birefringent materials to obtain phase matching, which enables traveling wave parametric amplification. Phase matching is the process of making the sum of the signal and idler wave vectors equal to the pumping wave vector. A wave vector is related to the product of index of refraction and frequency, or to index divided by wavelength.

In general, classical phase matching (e.g., via angle or thermal tuning) requires a certain combination of intrinsic birefringence and dispersion of refractive indices. New small molecular weight crystalline organic nonlinear optical materials with high second harmonic susceptibility have been reported in literature such as ACS Symposium, Series No. 233, pages 1–26, 1983 by Garito et al. These organic materials usually possess high intrinsic birefingence and positive dispersion so that phase matching can be achieved with a single crystal. Even if phase matching can be achieved with the new types of organic materials having high nonlinear optical susceptibility, the low beam power of a diode laser significantly limits the power conversion efficiency. The high birefringence of the organic materials also lowers the conversion efficiency because of beam walk-off.

An alternative means to achieve phase matched conditions is the use of dispersion properties for different modes in a waveguide. Since the energy is confined laterally to a narrowly constricted space, a high light intensity is possible with a relatively low power source. If the waveguide geometry and refractive indices of the guiding region and cladding region are such that:

$$\beta = \beta_n(\omega_3) - \beta_m(\omega_2) - \beta_l(\omega_1) = 0 \qquad (1)$$

then the phase matching condition is established. Here, $\beta_i$ is the propagation constant of the i-th mode. The conversion efficiency is generally quadratically dependent on the overlap integral between the modes:

$$F = \int E_n(\omega_3, z) E_m(\omega_2, z) E_l(\omega_1, z) dz$$

where $E_k$ is the normalized electric field of the k-th mode across the waveguide. In general, the overlap between the waveguide modes is limited, and the value of the overlap integral is also small. This approach has been utilized for second harmonic generation phase matching in waveguides derived from organic materials, as reported in Optics Commun., 47, 347 (1983) by Hewig et al. However, the level of second harmonic conversion efficiency is low, suggesting no practical parametric amplification application.

Of background interest with respect to the present invention are U.S. Pat. Nos. 3,267,385; 3,660,673; and 3,831,038 which describe optical parametric amplifier devices with inorganic nonlinear optical waveguiding means. Also of interest is literature relating to spatially periodic nonlinear structures for modulation of electromagnetic energy. The pertinent literature includes IEEE J. of Quantum Elect., QE-9 (No. 1), 9 (1973) by Tang et al; Appl. Phys. Lett., 26, 375 (1975) by Levine et al; Appl. Phys. Lett., 37(7), 607 (1980) by Feng et al; and U.S. Pat. Nos. 3,384,433; 3,407,309; 3,688,124; 3,842,289; 3,935,472; and 4,054,362.

The thin film waveguides with a periodically modulated nonlinear optical coefficient as described in the literature are either inorganic optical substrates with material fabrication disadvantages, or they are organic materials which are in the liquid phase, such as a liquid crystal medium or a thin film of nitrobenzene which require a continuously applied external DC electric field.

Of particular interest with respect to the present invention is literature relating to the dispersive properties of a thin film optical waveguide for TE and TM modes, as expressed in analytic terms defining the variation of the effective refractive index with respect to one or more physical parameters in the waveguiding medium. The pertinent literature includes J. Appl. Phys., 49(9), 4945 (1978) by Uesugi et al; Appl. Phys. Lett., 36(3), 178 (1980) by Uesugi; Nonlinear Optics: Proceedings Of The International School Of Materials Science And Technology, Erice, Sicily, July 1–14, 1985 (Springer-Verlag), pages 31–65 by Stegeman et al; Integrated Optics, Volume 48, pages 146–151 by Ostrowsky (Springer-Verlag, 1985); Integrated Optics, Volume 48, pages 196–201 by Bava et al (Springer-Verlag, 1985); and Appl. Opt., 25(12), 1977 (1986) by Hewak et al.

There is continuing interest in the development of compact and efficient nonlinear optical devices, such as parametric oscillators and amplifiers.

Accordingly, it is an object of this invention to provide an optical parametric amplifier device with an organic nonlinear optical waveguiding medium which is adapted to amplify the intensity of an input signal beam.

It is another object of this invention to provide an optical parametric amplifier device with a polymeric nonlinear optical waveguide channel having a spatial periodic structure for quasi-phase matching of propagating wave vectors, and with a refractive index tuning means for efficient phase matching.

Other objects and advantages of the present invention shall become apparent from the accompanying description and drawings.

DESCRIPTION OF THE INVENTION

One or more objects of the present invention are accomplished by the provision of an integrated optical parametric amplifier which comprises (1) a light signal source and (2) a laser beam source, in coupled combination with (3) an optical waveguide with a waveguiding matrix consisting of an organic film medium which exhibits second order nonlinear optical response, and which has a spatial periodic structure for quasi-phase matching of propagating waves; wherein the coherence length $l_c$ of the waveguide periodic organic medium is defined by the equation:

$$l_c = \frac{\pi}{\Delta \beta}$$

where $\Delta\beta$ is the propagation constant difference which is equal to $\beta(\omega_p) - \beta(\omega_s) - \beta(\omega_i)$, $\omega_p$ is the pump frequency, $\omega_s$ is the signal frequency, and $\omega_i$ is the idler frequency.

In another embodiment this invention provides an integrated optical parametric amplifier which comprises (1) a light signal source with a wavelength of about 0.5-2 μm, and (2) a laser beam source with a wavelength of about 0.6-1.3 μm, in coupled combination with (3) an optical waveguide comprising a two-dimensional channel structure for single mode wave transmission, and the channel waveguiding matrix comprises a polymer medium which exhibits second order nonlinear optical response, and which has a spatial periodic structure for quasi-phase matching of propagating waves; wherein the coherence length $l_c$ of the periodic polymer medium is in the range of about 10-100 μm, and is defined by the equation:

$$l_c = \frac{\pi}{\Delta \beta}$$

where $\Delta\beta$ is the propagation constant difference which is equal to $\beta(\omega_p) - \beta(\omega_s) - \beta(\omega_i)$, $\omega_p$ is the pump frequency, $\omega_s$ is the signal frequency, and $\omega_i$ is the idler frequency; and wherein the output wave energy under operating conditions comprises the incident laser beam, a generated idler beam, and an amplified signal beam.

In a further embodiment this invention provides an integrated optical parameter amplifier which comprises (1) a light signal source with a wavelength of about 0.5-4 μm, and (2) a laser beam source with a wavelength of about 0.6-1.3 μm and a power level of about 50-1000 mw, in coupled combination with (3) an optical waveguide comprising a two-dimensional channel structure for single mode wave transmission, and the channel waveguiding matrix comprises a side chain polymer medium which has an external field-induced noncentrosymmetric molecular orientation of side chains and a nonlinear optical coefficient d of at least about 10 pm/V, and which has a spatial periodic structure for quasi-phase matching of propagating waves; wherein the coherence length $l_c$ of the waveguide periodic polymer medium is in the range of about 10-100 μm, and is defined by the equation:

$$l_c = \frac{\pi}{\Delta \beta}$$

where $\Delta\beta$ is the propagation constant difference which is equal to $\beta(\omega_p) - \beta(\omega_s) - \beta(\omega_i)$, $\omega_p$ is the pump frequency, $\omega_s$ is the signal frequency, and $\omega_i$ is the idler frequency; and wherein the output wave energy under operating conditions comprises the incident laser beam, a generated idler beam, and an amplified signal beam with a gain G of about 10-1000.

An optical parametric amplifier inherently is a narrow band device, e.g., about 3 nm. The bandwidth range of the device can be broadened by utilization of a chirped type of periodic configuration in the waveguiding medium. In a chirped periodic configuration, the coherence length varies across the grating structure.

A parametric amplifier as defined hereinabove can be in further combination with electrodes for the application of an electric field to the organic waveguiding medium, and additionally with filter means to absorb the incident laser beam and generated idler beam from the output wave energy spectrum. Another means of isolating the output amplified signal beam is to employ a detector which senses only the signal beam.

Another preferred variation in optical parametric amplifier design is the inclusion of a heat control means for temperature tuning and phase matching of the propagating wave energy under operating conditions.

An invention optical parametric amplifier can be fabricated with a two-dimensional waveguide having channel dimensions w of 5 μm, a refractive index n of 1.6, and a nonlinear optical coefficient d of 100 pm/V. When $P_p$ is 0.1 W, $\lambda_s$ 1.3 μm and $\lambda_p$ is 0.8 μm under operating conditions, with an assumed absorption coefficient $\alpha_i$ of 4/cm, an exponential gain coefficient g of 6.4/cm, and a gain G of 1000 is obtained.

Referring to the drawings, FIG. 1 is a perspective view of an integrated optical parametric amplifier in accordance with the present invention.

FIG. 2 is a representation of side view sections of a FIG. 1 type waveguide thin film, illustrating alternating poled molecularly oriented domains in one section, and poled molecularly oriented domains alternating with unpoled domains in the other section.

Figure 3:
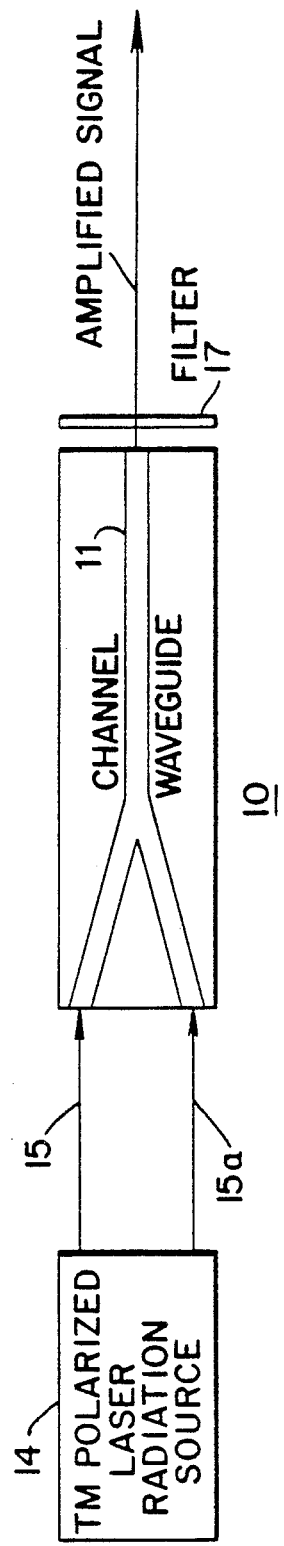
FIG. 3 is a schematic drawing of a FIG. 1 type of optical parametric amplifier with a two-dimensional channel waveguide design.

Thin film waveguide 10 in FIG. 1 is a composite construction of substrate 12 which supports nonlinear optically active polymer film 11. A linear section of polymer film 11 consists of periodic nonlinear optical modulation zone 13.

In practice thin film waveguide 10 is utilized in combination with transverse magnetic (TM) polarized laser radiation source 14 which provides input pump laser beam 15 and input signal beam 15a; a pair of prism coupling means 16 which couple laser beam 15 and signal beam 15a to polymer film 11; filter 17; and utilization apparatus 18, such as a communications system.

Beam splitter 19 is utilized to direct a portion of the output signal to detector 20, which drives feedback amplifier 21. The heater 22 units are temperature controlled within a ±0.5° C. range, and the temperature is maintained at the point of maximum phase matched $\chi^{(2)}$ generation as monitored by the signal detection means.

The input TM polarized coherent electromagnetic radiation preferably is a laser beam such as that generated by a diode laser with a wavelength in the 0.8-0.86 μm range.

The coupling means can consist of a pair of prism couplers, such as Schott $SF_6$ optical glass with a high index of refraction. Optical coupling and decoupling also can be accomplished with optical diffraction gratings which are formed directly on the surface of the thin film waveguide, as described in U.S. Pat. Nos. 3,674,335; 3,874,782; and 3,990,775. Another coupling means is through the cleaved end faces of a waveguiding structure, as shown in FIG. 3.

The substrate 12 as illustrated in FIG. 1 can be constructed of any convenient non-conducting medium such as plastic, glass, or silicon oxide.

The heater units 22 typically are encapsulated in a ceramic or other inorganic medium, or in a polymer medium such as an epoxy resin.

The organic thin film waveguiding medium of an invention optical parametric amplifier device is transparent, either liquid crystalline or amorphous in physical properties, and exhibits second order nonlinear optical response. The organic medium has a higher refractive index (e.g., 1.5) than the supporting substrate, or higher than the cladding layer (e.g., sputtered silica or an organic material) if one is composited between the polymer medium and the supporting substrate.

The transparent polymer medium can be applied to the supporting substrate by conventional methods, such as spin coating, spraying, Langumir-Blodgett deposition, and the like.

The term "transparent" as employed herein refers to an organic thin film waveguide medium which is transparent or light transmitting with respect to incident fundamental and created light frequencies. In a present invention waveguide parametric amplifier device, the organic thin film nonlinear optical waveguiding medium is transparent to both the incident and exit light frequencies.

The term "amorphous" as employed herein refers to a transparent polymeric optical medium which does not have a preferred short range molecular order that exhibits optical anisotropy.

The term "external field" as employed herein refers to an electric, magnetic or mechanical stress field which is applied to a substrate of mobile organic molecules, to induce dipolar alignment of the organic molecules parallel to the field.

The term "parametric" as employed herein refers to interactions in wave energy states in an optical medium in which time variations in an input signal are translated into different time variations in an output signal as determined by an operative nonlinearity parameter.

A present invention organic thin film waveguide medium preferably is a polymer having a comb structure of side chains which exhibit nonlinear optical response. This type of chemical structure is illustrated by thermoplastic polymers which are characterized by a recurring monomeric unit corresponding to the formula:

where P' is a polymer main chain unit, S' is a flexible spacer group having a linear chain length of between about 2-20 atoms, M' is a pendant group which exhibits second order nonlinear optical susceptibility, and where the pendant groups comprise at least about 25 weight percent of the polymer, and the polymer has a glass transition temperature or softening point above about 40° C.

Among the preferred types of side chain polymers are those characterized by a recurring monomeric unit corresponding to the formula:

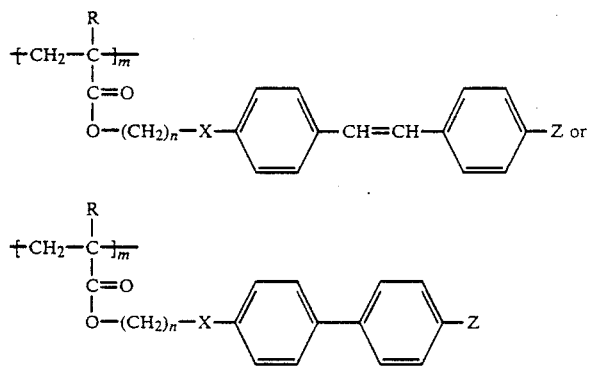

where m is an integer of at least 5; n is an integer between about 4-20; X is —NR—, —O— or —S—; R is hydrogen or a $C_1$-$C_4$ alkyl; and Z is —$NO_2$, —CN, —$CF_3$, —CH=C(CN)$_2$, —C(CN)=C(CN)$_2$ or —$SO_2CF_3$.

Side chain polymers of interest are described in U.S. Pat. No. 4,694,066. Illustrative of side chain polymer species are poly[6-(4-nitrobiphenyloxy)hexyl methacrylate], poly(L-N-p-nitrophenyl-2-piperidinemethyl acrylate), and stilbene-containing polymers such as:

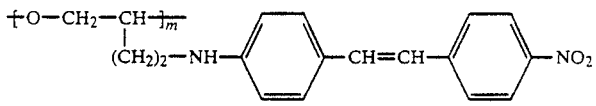

A preferred type of side chain polymer is the copolymer structure disclosed in U.S. Pat. No. 4,865,430.

An essential feature of a present invention optical parametric amplifier device is a periodic nonlinear optical modulation zone 13 as represented in FIG. 1. The periodicity of a waveguide NLO modulation zone preferably is accomplished by poling with an electric field to achieve orientation of the organic molecules parallel to the direction of the electric field. The poling induces a microscopic noncentrosymmetry in the poled domains of the organic medium, and establishes second order nonlinear optical susceptibility in the organic medium.

Poling of a thin film waveguide medium can be accomplished conveniently by heating the medium near or above its melting point or glass transition temperature, then applying a DC electric field (e.g., 50–150 V/$\mu$m) to the medium to align molecular dipoles in a uniaxial orientation. The medium then is cooled while the medium is still under the influence of the applied DC electric field. In this manner a stable and permanent molecular orientation is immobilized in a rigid structure within the poled domains.

The poling can be applied to an organic medium that is substrate-supported, by an appropriate placement of upper and lower electrode units, where one of which has a grating configuration.

In another invention embodiment, cladding layers are employed which are in the form of organic films exhibiting second order nonlinear optical response and having a lower index of refraction than the waveguiding organic medium. In a typical waveguide construction, the organic waveguiding medium and cladding layers are side chain polymers, respectively, all of which can be molecularly oriented simultaneously during an electric field poling cycle.

The following examples are further illustrative of the present invention. The device components are presented as being typical, and various modifications in design and operation can be derived in view of the foregoing disclosure within the scope of the invention.

EXAMPLE I

This example illustrates the construction and operation of an optical parametric amplifier in accordance with the present invention.

The material refractive indices are measured at 0.8626 μm, 1.34 μm and 2.42 μm corresponding to the pump, signal and idler wavelengths used in the device fabrication. For a (50/50) methyl methacrylate/4-[N-(2-methacroyloxyethyl)-N-methylamino]-4'-nitrostilbene waveguiding medium the indices are 1.6514, 1.6258, and 1.6161, respectively. For the cladding material (Norland 60 epoxy) the indices are 1.549, 1.545 and 1.543, respectively.

The periodicity of the waveguide is a function of the polymer medium dispersion, and also of the waveguide dispersion. Maxwell's equations for a thin film waveguide are solved for TM modes for the pump, signal and idler beams, respectively. The calculated periodicity is 20.2 μm.

A periodic poled waveguide is fabricated in accordance with the following procedure. A commercially available silicon dioxide coated silicon wafer is placed in a Varian electron beam vacuum deposition system. A 200 Å layer of 99.999% purity aluminum is deposited on the wafer.

Az-1518 positive photoresist (Hoechst) is spin coated on the aluminum coated wafer with a Soltec model 5100 coater. A 1.5 μm photoresist coating is achieved by spinning at 5000 rpm for 30 seconds. The photoresist coating is dried in a vacuum oven at 90° C. for 30 minutes.

The photoresist coating is patterned by placing the wafer in contact with a mask of the desired periodicity in a Karl Suss model MJB 3 mask aligner, and exposing the masked coating to 405 nm radiation (70 mJ/cm$^2$).

The patterned photoresist is developed with AZ developer in water (1:1) over a period of 60 seconds, and the developing cycle is terminated by washing with deionized water.

The photoresist coating of the wafer is baked in a vacuum oven at 120° C. for 45 minutes. The exposed aluminum pattern is etched with type A etchant (Transene Corp.) at 50° C. for 20 seconds, and the etched surface is rinsed with deionized water. The periodicity of the electrodes is 20 μm.

The aluminum grating electrode surface of the wafer is covered with 1.8 μm cladding layer (Norland 60 epoxy) by spin coating at 9500 rpm for 30 seconds at 35° C., and the cladding layer is cured by ultraviolet radiation at 15 mW/cm$^2$ for 4 minutes.

A nonlinear optically active organic layer of 2 μm thickness of the above-identified 50/50 polymer is spin coated on the cladding layer at 1500 rpm. The spin coating medium is a 20% solution of the polymer in cyclohexanone. The polymer layer is dried in a vacuum oven at 160° C. for 2 hours, and then cooled down slowly.

An upper cladding layer of 1.8 μm thickness is added by spin coating a medium of Norland 60 epoxy resin at 9500 rpm for 30 seconds at 35° C. The cladding layer is cured by ultraviolet radiation at 15 mW/cm$^2$ for 4 minutes. A 1000 Å coating of gold is deposited as an electrode layer on the upper cladding layer.

The waveguide structure is cleaved at opposite ends to provide two sharp faces to couple light in and out of the polymer waveguiding medium. Wires are attached to the top and bottom electrodes. The waveguide is poled by placing it in a Mettler hot stage. It is heated at 1° C./min to Tg at 90° C., and a field of 70 V/μm is applied for 5 minutes. Then the waveguide is cooled at 0.2° C./min to room temperature while maintaining the electric field. The poled waveguiding medium has a nonlinear optical coefficient d of about 80 pm/V.

An optical arrangement for testing the parametric amplifier is as follows. A Quantel TDL 50 dye laser is employed to pump a H$_2$ Raman cell to produce 0.8626 μm and 1.34 μm light as the first and second Stokes lines, respectively. The first Stokes line is intense and acts as the pump for the parametric amplifier, and the weaker second Stokes line functions as the signal beam which is going to be amplified. The two beams are emitted from the H2 cell colinearly, and are directed by a focusing lens into the waveguiding medium. Interference filters allow adjustment of the pump power into the waveguide, while leaving the signal intensity unchanged. Interference filters are placed after the waveguide to block the pump at 0.8626 μm. The idler produced at 2.42 μm also is not detected because the detectors utilized did not respond at that wavelength.

Two methods are employed to detect the amplified signal at 1.3 μm. The first method is the use of a germanium detector. The second method is based on the fact that the 1.3 μm signal produces a second harmonic at 0.65 μm, since the waveguide is also a second order nonlinear optical $\chi^{(2)}$ medium. By placing a narrow pass filter at 0.65 μm on a photomultiplier tube, a suitable signal to noise discrimination against background is obtained.

The waveguide is placed on a hot stage with a ±0.5° C. temperature control. The hot stage is mounted on a rotation stage such that the effective periodicity of the grating can be changed by angling of the incident beams. 1.3 μm light is coupled into the waveguide and detected. At the correct periodicity where phase matching occurs, the pump at 0.86 μm also is coupled into the waveguide, resulting in an amplified 1.3 μm signal. The polarization of the input and output signals is TM, indicating that the d$_{33}$ coefficient had been phase matched. Away from the phase matching periodicity, no amplification is observed.

Additional methods of tuning are by changing the temperature of the waveguide which results in large changes in refractive indices, and by applying a voltage across the waveguide which results in small changes in refractive indices.

In another embodiment side chain polymer cladding layers are utilized which exhibit second order nonlinear optical susceptibility, and which have a lower index of refraction than the waveguiding medium.

EXAMPLE II

This Example illustrates the construction and operation of a two-dimensional rib waveguide for optical parametric amplification in accordance with the present invention.

Following the procedures of Example I, an oxidized silicon substrate (2 microns of $SiO_2$ on Si) is coated with an aluminum grating electrode. A thin (1000 angstroms) polysiloxane layer is spin-coated from a 7% solution at 4000 rpm and cured for 45 minutes at 110° C. A spin-coated Master Bond UV11-4M1 epoxy (Master Bond Inc.) layer 2 microns thick is deposited by spin-coating at 3000 rpm, and curing for 20 minutes under a 25 mw/cm² u.v. mercury-xenon arc lamp. The surface is treated by exposure to a 5 watt r.f. oxygen plasma in a reactive-ion-etcher for 5 seconds and is coated with a nonlinear optically active organic layer (1.25 microns) as in Example I. A second epoxy layer is applied as described above and cured for 5 minutes.

The upper cladding layer is coated with an aluminum masking layer (2000 angstroms). A narrow AZ-1518 photoresist ribbon-like strip (5.5 microns in width) is coated on the aluminum in the waveguiding direction of the laminated structure. The aluminum not covered by the photoresist is removed as in Example I. The upper surface of the waveguide structure is exposed to reactive ion etching to remove the multilayers down to the bottom polysiloxane layer, except for the photoresist coated strip. The etching cycles also remove the photoresist coating from the aluminum strip. The aluminum coating is removed from the ribbon-like strip of multilayers. The substrate and the upper surface multilayer strip are spin-coated with Master Bond UV1-4M1 epoxy at 2500 rpm, and the coating is cured by means of the above described conditions.

Following the procedures of Example I, an upper aluminum grating electrode (1000 angstroms) is constructed on the upper epoxy layer, and the nonlinear optically active polymer layer is molecularly oriented by means of a DC field applied between the electrodes. The poled waveguiding medium has a nonlinear optical coefficient d of about 100 pm/V.

The two endfaces in the waveguiding direction are cleaved for end-fire coupling of light into and out of the two-dimensional waveguiding channel.

The fine adjustment of the waveguide $\chi^{(2)}$ period to match the polymer channel coherence length is accomplished by electrooptic tuning of the linear refractive index by application of an electric field between the electrodes, or by temperature adjustment.

The waveguide is coupled with a Quantel TDL 509 dye laser and $H_2$ Raman cell, and a signal beam is amplified in the manner described in Example I.

What is claimed is:

1. An integrated optical parametric amplifier which comprises (1) a light signal source and (2) a laser beam source, in coupled combination with (3) an optical waveguide with a waveguiding matrix consisting of an organic film medium which exhibits second order nonlinear optical response, and which has a spatial periodic structure for quasi-phase matching of propagating waves; wherein the coherence length $l_c$ of the waveguide periodic organic medium is defined by the equation:

$$l_c = \frac{\pi}{\Delta\beta}$$

where $\Delta\beta$ is the propagation constant difference which is equal to $\beta(\omega_p) - \beta(\omega_s) - \beta(\omega_i)$, $\omega_p$ is the pump frequency, $\omega_s$ is the signal frequency, and $\omega_i$ is the idler frequency.

2. An integrated optical parametric amplifier which comprises (1) a light signal source with a wavelength of about 0.5–4 μm, and (2) a laser beam source with a wavelength of about 0.6–1.3 μm, in coupled combination with (3) an optical waveguide comprising a two-dimensional channel structure for single mode wave transmission, and the channel waveguiding matrix comprises a polymer medium which exhibits second order nonlinear optical response, and which has a spatial periodic structure for quasi-phase matching of propagating waves; wherein the coherence length $l_c$ of the periodic polymer medium is in the range of about 10–100 μm, and is defined by the equation:

$$l_c = \frac{\pi}{\Delta\beta}$$

where $\Delta\beta$ is the propagation constant difference which is equal to $\beta(\omega_p) - \beta(\omega_s) - \beta(\omega_i)$, $\omega_p$ is the pump frequency, $\omega_s$ is the signal frequency, and $\omega_i$ is the idler frequency; and wherein the output wave energy under operating conditions comprises the incident laser beam, a generated idler beam, and an amplified signal beam.

3. An integrated optical parameter amplifier which comprises (1) a light signal source with a wavelength of about 0.5–4 μm, and (2) a laser beam source with a wavelength of about 0.6–1.3 μm and a power level of about 50–1000 mw, in coupled combination with (3) an optical waveguide comprising a two-dimensional channel structure for single mode wave transmission, and the channel waveguiding matrix comprises a side chain polymer medium which has an external field-induced noncentrosymmetric molecular orientation of side chains and a nonlinear optical coefficient d of at least about 10 pm/V, and which has a spatial periodic structure for quasi-phase matching of propagating waves; wherein the coherence length $l_c$ of the waveguide periodic polymer medium is in the range of about 10–100 μm, and is defined by the equation:

$$l_c = \frac{\pi}{\Delta\beta}$$

where $\Delta\beta$ is the propagation constant difference which is equal to $\beta(\omega_p) - \beta(\omega_s) - \beta(\omega_i)$, $\omega_p$ is the pump frequency, $\omega_s$ is the signal frequency, and $\omega_i$ is the idler frequency; and wherein the output wave energy under operating conditions comprises the incident laser beam, a generated idler beam, and an amplified signal beam with a gain G of about 10–1000.

4. A parametric amplifier in accordance with claim 3 wherein the waveguide polymer medium has a chirped periodic configuration.

5. A parametric amplifier in accordance with claim 3 wherein the channel surfaces are in contact with an organic cladding medium which exhibits second order nonlinear optical response and which has a lower index of refraction than the channel waveguiding polymer medium.

6. A parametric amplifier in accordance with claim 3 wherein the optical waveguide is in further combination with electrodes for the application of an electric field to the channel waveguiding polymer medium.

7. A parametric amplifier in accordance with claim 3 wherein the optical waveguide is in further combination with heat control means for temperature tuning and phase matching of the propagating waves.

8. A parametric amplifier in accordance with claim 3 wherein the amplifier is in further combination with filter means to absorb the incident laser beam and generated idler beam from the output wave energy.

9. A parametric amplifier in accordance with claim 3 wherein the channel waveguiding medium comprises a polymer which is characterized by a recurring monomeric unit corresponding to the formula:

where P' is a polymer main chain unit, S' is a flexible spacer group having a linear chain length of between about 1-20 atoms, M' is a pendant group which exhibits second order nonlinear optical susceptibility, and where the pendant side chains consist of at least about 25 weight percent of the polymer, and the polymer has a glass transition temperature above about 40° C.

10. A parametric amplifier in accordance with claim 9 wherein the M' group in the formula contains a biphenyl structure.

11. A parametric amplifier in accordance with claim 9 wherein the M' group in the formula contains a stilbene structure.

12. A parametric amplifier in accordance with claim 9 wherein the recurring monomeric unit corresponds to the formula:

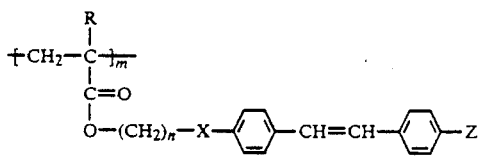

where m is an integer of at least 5; n is an integer between about 2-20; X is an electron-donating group; and Z is an electron-withdrawing group.

* * * * *